Sept. 18, 1928.
T. HINTERMANN
HARVESTING MACHINE WITH SCATTERER
Filed April 3, 1926
1,684,626
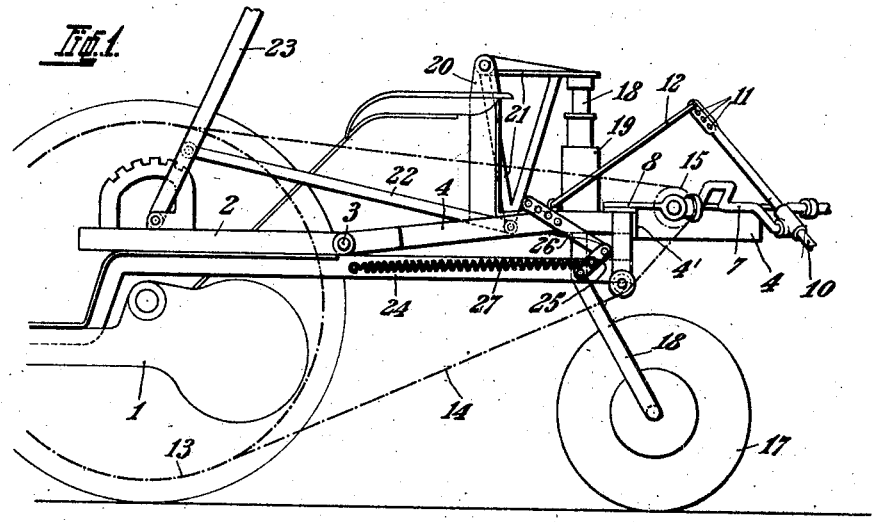
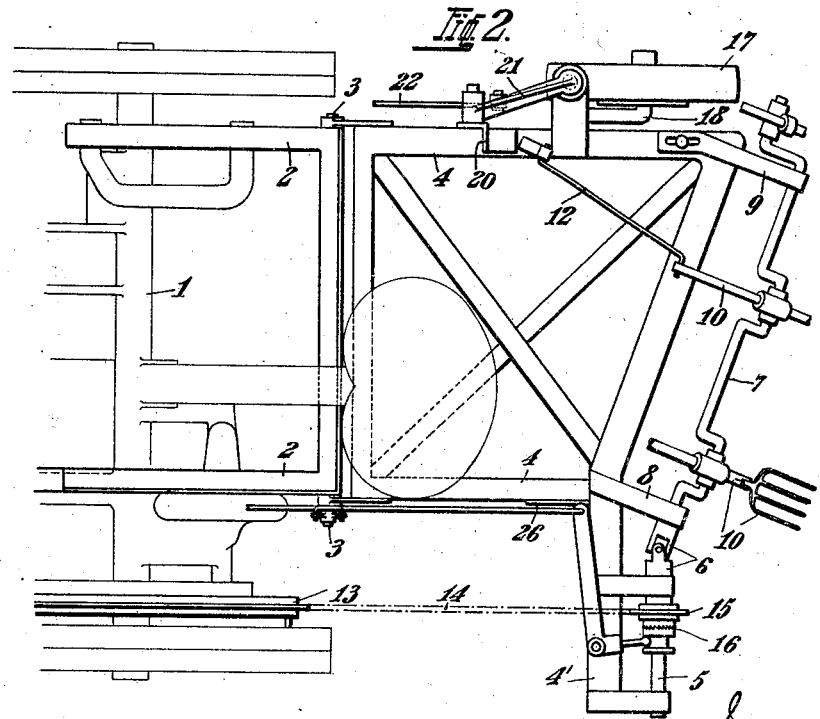

Patented Sept. 18, 1928.

1,684,626

UNITED STATES PATENT OFFICE.

THEODOR HINTERMANN, OF BERN, SWITZERLAND.

HARVESTING MACHINE WITH SCATTERER.

Application filed April 3, 1926, Serial No. 99,679, and in Switzerland April 9, 1925.

The object of my invention is a combined harvesting machine and scatterer in which a framework that bears the scatterer is mounted upon the frame of the harvesting machine so as to be capable of oscillating upwards and downwards.

In the accompanying drawing, which illustrates the invention by way of example, the new machine is represented in side-view and top plan view respectively.

On the framework 2, which is firmly connected with the driving frame of the harvesting machine, the framework 4 is mounted in a way that admits of an upward and downward oscillation by means of studs 3, which lie in an axis that is parallel to the wheel axis. At the back cross-bar 4', and lying obliquely to the wheel-axis of the harvesting machine and prolonged at one end sideways so as to extend beyond the shorter longitudinal bar of the frame 4, are provided the driving shaft 5 and the crank shaft 7, coupled with the former by means of a universal joint 6. The oblique position of the crank shaft 7 can be changed by the adjustment of its bearings 8 and 9. On the cranks of the shaft 7 are disposed scattering forks 10, the upwardly extending portions of which are provided with several perforations 11 and are connected with the framework 4 by means of a link 12. By the adjusting of the point at which the said link acts on the forks 10, the path of the curve, which is made by the forks when the crank shaft is rotated, is changed. The drive of the shaft 5 is effected from the one wheel of the harvester by means of a sprocket-wheel 13, mounted on the inner side, a chain 14, and a sprocket-wheel 15 fixed on the shaft 5; the said wheel 15 can be coupled with the shaft 5 by means of a clutch-coupling 16. The framework 4 is supported on the side of its longer longitudinal rod by an oscillatory caster 17. The upwardly extending end of the axis 18 of the caster is vertically movable in a bushing 19, carried by the framework 4 and supports a cranked lever 21, which is pivoted at 19 on a bracket 20, the other end of which lever is connected with a control lever 23 by means of a link 22. By properly adjusting the lever 23, the framework 4 can be moved to a more or less inclined position, whereby the forks 10 can be positioned higher or lower as desired. The articulated connection of the forks with the machine frame has the advantage that the forks are protected against injury. If, for instance due to the stopping of the team of horses, the harvesting machine becomes strongly inclined towards the rear and is then moved slightly backwards, then the back part of the frame carrying the forks is raised upwards so that the forks do not come into contact with the ground. In order to prevent the framework 4 from getting warped and out of shape in consequence of its one-sided resting on the ground, there is constructed on the shorter side of the framework the supporting contrivance hereinafter described. From the framework 2 there projects towards the rear under the framework 4 on the side of the chain gearing 13, 14 and 15, an arm 24 which is connected by means of a toggle joint 25, 26 with the shorter longitudinal rod of the framework 4. A spring 27, connected at one end to the arm 24 and at the other end to the lower toggle member 25, tends to straighten the toggle joint 25, 26. By an adjustment of the point, at which the upper toggle member 26 is attached to the framework 4, the tension, or the supporting effect, of the spiral spring 27 upon the framework 4 can be regulated, that is to say, it can be adapted to the weight of the same, so that no tendency to torsion can arise.

With harvesting machines drawn by tractors, the frame which bears the scattering device can be supported on both sides by means of casters.

What I claim is:

1. In combination with a harvesting machine a scatterer, comprising a frame carrying the scattering members and pivoted to said harvesting machine frame, said frame having unequal sides, a caster supporting the longer side of said frame, a supporting arm secured to said harvesting machine frame, and a spring controlled toggle joint connecting said supporting arm and the shorter side of said frame.

2. In combination with a harvesting machine a scatterer, comprising a frame pivoted to said harvesting machine frame and supporting the scattering members and frame having unequal sides, a caster supporting the longer side of said frame, a movable stem carrying said caster, a control lever for adjusting the position of said caster by means of said stem, a supporting arm secured to said harvesting machine frame, and a spring-controlled toggle-joint connecting said supporting arm and the shorter side of said frame.

Signed at Bern, this 23 day of March 1926.

In testimony whereof I affix my signature.

THEODOR HINTERMANN.